Dec. 29, 1953  K. R. CLARK  2,663,984
LEAF PULVERIZER FOR ROTARY TYPE LAWN MOWERS
Filed April 30, 1952
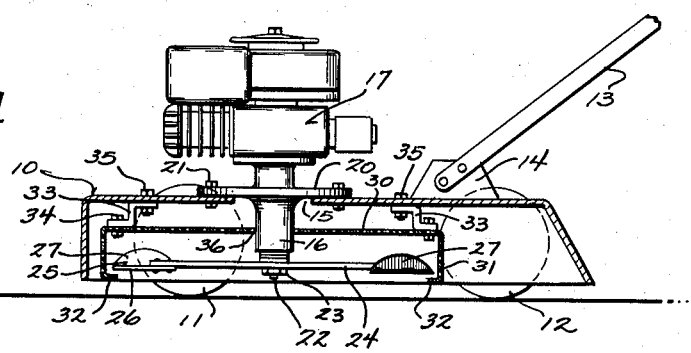
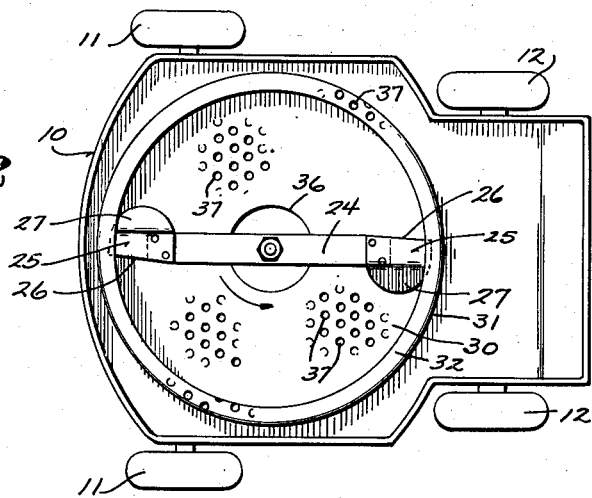
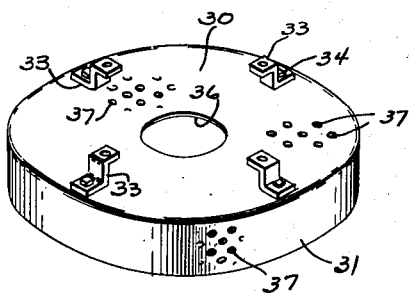
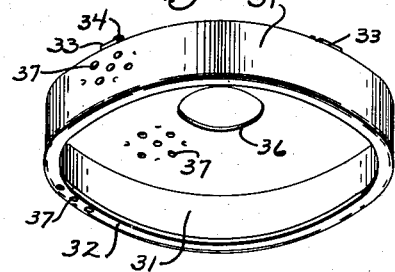
INVENTOR
KENNETH R. CLARK
BY *Wheeler, Wheeler & Wheeler*
ATTORNEYS Patented Dec. 29, 1953

2,663,984

UNITED STATES PATENT OFFICE 2,663,984

LEAF PULVERIZER FOR ROTARY TYPE LAWN MOWERS

Kenneth R. Clark, Milwaukee, Wis.

Application April 30, 1952, Serial No. 285,135

10 Claims. (Cl. 56—25.4)

This invention relates to a leaf pulverizer for rotary type lawn mowers.

It is considered advantageous for a lawn mower to so comminute grass cuttings, leaves and the like as to return these pulverized fragments of organic matter to the soil as mulch about the grass roots. It is the object of the present invention to provide a leaf pulverizing attachment which may be incorporated in existing rotary sickle type lawn mowers or incorporated as original equipment thereon.

The preferred form of the invention consists of a foraminous screen or hood disposed within the housing above the rotating sickle and against which the sickle projects grass and leaf cuttings for comminution. For this purpose, the sickle blade is desirably provided with fan blades to impel the cuttings against the screen for more effective fragmentation. In the preferred embodiment of the present invention, the screen comprises a top wall and a skirt forming a chamber above the path of the sickle, which is substantially closed except for escape of the comminuted fragments through the screen apertures. The entire top wall and skirt are provided throughout with perforations and the screen thus formed holds the whirling leaf and grass matter lifted by the sickle blades until this matter is thoroughly pulverized to such a degree that it may escape through the perforations and return to the soil. The screen may clog unless it has substantial area and it desirably comprises a continuous foraminous wall concentric with, and close to, the path of the blades. As the entire circumference of the screen or hood is perforated, the entire perimeter of sickle blade travel is effective to force the leaves against the edge margins of the perforations to improve pulverizing action and substantially preclude clogging.

In the drawings:

Fig. 1 is a view partly in side elevation and partly in vertical section through a lawn mower embodying my invention.

Fig. 2 is an inverted plan view of a lawn mower embodying my invention.

Fig. 3 is a top perspective view of a foraminous screen embodying my invention.

Fig. 4 is a bottom perspective view of the foraminous screen of Fig. 3.

The lawn mower illustrated in the drawings is for exemplification only as my attachment may be used with practically any type of lawn mower having a rotary sickle. As before indicated, it is desirable that the blades of such sickle have an upward rake at their trailing edges, thus using the top as well as the side wall of the screen as a comminuting means.

The particular lawn mower chosen to exemplify the invention comprises a downwardly open housing 10 supported on paired front wheels 11 and paired rear wheels 12. The housing is provided near its rear top surface with a conventional propelling handle 13 having a bracket mounting 14 on the housing. The central portion of the top of the housing is apertured at 15 to receive the downwardly extending drive shaft bearing tube 16 of a conventional engine 17.

The engine is mounted on bearing tube flange 20, which spans the housing aperture 15 and is secured marginally thereto by the bolts 21.

Within the bearing tube 16 is the drive shaft 22 which is fastened by means of nut 23 to arm 24 of the rotary sickle. The arm 24 carries at its outer ends blades 25 which have leading cutting edges 26 and trailing edges 27, which are upwardly inclined and act as fan blades to create an upward draft. The direction of sickle rotation is indicated by the arrow in Fig. 2.

Within the chamber formed by the housing 10, I mount between the top wall of the housing and the rotary path of sickle arm 24 a foraminous comminuting screen, the screen comprising a top wall 30 and a peripheral skirt 31 which depends from the top wall sufficiently to enclose the rotary path of the sickle. The space between the top wall 30 and the rotary path of the sickle constitutes a substantially closed pulverizing chamber within the housing. During operation, the rotary sickle precludes return of the pulverized cuttings which must all pass through the screen. The skirt 31 is desirably provided with an inturned flange or rim 32 which partially underlies the rotary path of the blade to more completely close the pulverizing chamber.

The foraminous screen is mounted by means of the brackets 33 which are bolted to the top wall 30 of the screen by bolts 34 and to the undersurface of the top wall of the housing 10 by the bolts 35. The top wall 30 of the screen is also provided with a central aperture 36 to receive the engine bearing tube 16. The foraminous screen is desirably provided throughout its top wall 30 and the skirt 31 with relatively small apertures indicated generally by reference character 37. I have found that apertures one half inch in diameter and disposed on one inch centers are satisfactory, although exact dimensions are not critical. As best shown in Fig. 4, the inturned rim 32 of the skirt is also desirably provided with an arcuate series of like apertures of small diameter.

While the exact position of the screen within the housing is not critical, its top wall should be sufficiently spaced above the path of the rotary sickle to provide for a pulverizing chamber in which grass clippings and leaves elevated by the fan action of the blades 25 may whirl about and impact against the screen and against the edges of the apertures 37 for comminution. Thereafter, the pulverized fragments discharge through the apertures into the chamber within the housing 10 and above and about the foraminous screen. For this purpose there should be space between the top wall 30 of the screen and the top wall of the housing 10, and between the skirt 31 of the screen and the skirt of the housing.

I claim:

1. An attachment for use with a mower comprising a wheeled housing and a prime mover mounted thereon and provided with a cutting blade rotatable within the housing, said attachment comprising an inverted cup-shaped casing having brackets supporting it within the housing in a blade-enclosing position, said casing having an annular foraminous top wall spaced below the top of the housing to provide clearance to permit said blade to project comminuted material through said top wall.

2. The device of claim 1 in which the casing comprises an annular foraminous wall encircling the blade and in close proximity to the path of blade rotation.

3. A mower comprising a wheeled frame, a housing forming a chamber, a cutting blade rotatable in the chamber, and a foraminous screen in the chamber proximate to the rotatable blade and against which said blade projects cuttings for comminution, the screen being above the blade and said blade comprising a cutting edge, and an air propelling edge upwardly inclined toward said screen.

4. A mower comprising a wheeled frame, a housing forming a chamber, a cutting blade rotatable in the chamber, and a foraminous screen in the chamber proximate to the rotatable blade and against which said blade projects cuttings for comminution, said screen comprising a top wall, and a foraminous annular skirt enclosing the path of said blade and forming a substantially closed comminuting chamber within said housing and through which screen substantially all cuttings must pass.

5. The device of claim 4 in which the screen skirt is provided with an annular rim partially underlying the path of blade travel.

6. The device of claim 4 in which the top wall is also foraminous and the blade comprises a fan with upward pitch.

7. An attachment for a mower having a housing wall and a rotary sickle therewithin, said attachment comprising a foraminous screen having a top wall adapted to be mounted between the sickle and the housing wall and an annular skirt depending therefrom to enclose the path of said sickle.

8. The attachment of claim 7 in which the top wall is provided with a central aperture to receive a power shaft to the sickle, said skirt being provided with an annular rim positioned to partially underlie the path of the sickle.

9. An attachment for a mower having a housing with top and side wall portions and a rotary sickle beneath the top and within the side wall portions, said attachment comprising an inverted cup shaped foraminous screen having bracket means projecting therefrom and constituting a support for connection with said mower housing, said screen being sufficiently smaller than the housing to be spaced therefrom vertically and laterally, the screen comprising a top wall and an annular skirt enclosing the sickle.

10. The attachment described in claim 9 in which the skirt is provided with an inwardly projecting annular rim positioned to partially underlie the path of the sickle.

KENNETH R. CLARK.

References Cited in the file of this patent

UNITED STATES PATENTS

| Number | Name | Date |
| --- | --- | --- |
| 2,242,922 | Poynter | May 20, 1941 |
| 2,273,405 | Hoehn | Feb. 17, 1942 |
| 2,500,981 | Eymeric | Mar. 21, 1950 |